United States Patent [19]

Randell et al.

[11] 4,207,224
[45] Jun. 10, 1980

[54] PLASTICS COMPOSITION

[75] Inventors: Donald R. Randell, Stockport; Thomas G. Hyde, Sale; Frank Lamb, Bury; Brian G. Clubley, Sale; Boyce I. D. Davis, Cheadle, all of England

[73] Assignee: Ciba-Geigy AG, Basel, Switzerland

[21] Appl. No.: 876,604

[22] Filed: Feb. 10, 1978

[30] Foreign Application Priority Data

Feb. 12, 1977 [GB] United Kingdom ................. 5937/77

[51] Int. Cl.$^2$ .............................................. C08K 5/52
[52] U.S. Cl. ......................... 260/30.6 R; 260/45.7 R; 260/45.85 R; 260/45.7 P
[58] Field of Search ........... 260/45.7 R, 45.85, 45.7 P, 260/30.6

[56] References Cited

FOREIGN PATENT DOCUMENTS 1802137 4/1969 Fed. Rep. of Germany .
2329706 5/1977 France .
2343031 9/1977 France .

Primary Examiner—V. P. Hoke
Attorney, Agent, or Firm—Wenderoth, Lind & Ponack

[57] ABSTRACT

Aromatic hydrocarbon oligomers of the formula $$(A)_a(-CH_2-)_b[-CH_2(OCH_2)_m OCH_2-]_c(-CH_2X)_d$$

wherein A is at least one aromatic hydrocarbon or heterocyclic residue, X is OH or a derivative thereof, a is 2 to 20 but equals $b+c+1$, b is 0 to 19, c is 0 to 19, d is 0 to 2a and m is 0 to 10, there being at least two ($-CH_2X$) groups per molecule, the group each $-CH_2O-CH_2-$ portion of the group counting as ($-CH_2X$) for this purpose, are suitable as non-volatile fire retardent agents in chlorine-containing aliphatic polymers, copolymers or polyblends, which contain an ester of an phosphorus acid.

32 Claims, No Drawings

PLASTICS COMPOSITION

The present invention relates to flame retardant polymer compositions, and it relates in particular to chlorine containing aliphatic polymers, copolymers and poly blends.

In the German Offenlegungsschrift No. 2,648,701 there is described a composition comprising a chlorine-containing aliphatic polymer and (a) an ester of a phosphorus acid and (b) a compound of the formula $$R(CH_2X)_n$$

in which R represents an aromatic hydrocarbon or heterocyclic containing residue, n is an integer of at least 2 and each X is the same or different and represents a leaving group.

We have now found that certain oligomers when used as the compound $R(CH_2X)_n$ provide in conjunction with the phosphorus acid ester compositions having good plasticising properties and the oligomers also have the advantage of lower volatility. At the same time the fire retardant effect of the phosphorus compounds in the chlorine containing aliphatic polymers can be greatly improved by the use of certain supplemental additives. As a result, either a greater fire resistance can be achieved without increasing the phosphorus content of the polymer or the same fire resistance can be achieved with a lower phosphorus content.

Accordingly, the present invention provides compositions comprising a chlorine-containing aliphatic polymer, copolymer or poly blend, and (a) an ester of a phosphorus acid, and (b) an aromatic hydrocarbon oligomer of the formula.

$$(A)_a(-CH_2-)_b[-CH_2(OCH_2)_mOCH_2-]_c(-CH_2X)_d \quad I$$

wherein A is at least one aromatic hydrocarbon or heterocyclic residue, X is OH or a derivative thereof, a is 2 to 20 but equals b+c+1, b is 0 to 19, c is 0 to 19, d is 0 to 2a and m is 0 to 10, preferably 0–5, most preferably 0, there being at least two (-CH$_2$X) groups $CH_2OCH_2$ per molecule, each portion of the group [—CH$_2$(OCH$_2$)$_m$OCH$_2$—]$_c$ counting as (—CH$_2$X) for this purpose.

It should be noted that the values of a, b, c, d and n are average values for the average molecule of formula I.

Examples of aromatic residues A are benzene, naphthalene, furan, anthracene, biphenyl and diphenyl ether. The aromatic residue A may be unsubstituted or substituted, but if it is substituted it preferably carries only one substituent. Suitable substituents include halogen, alkyl groups with 1 to 4 carbon atoms, haloalkyl groups with 2 to 4 carbon atoms, and the group OR$^3$ where R$^3$ is hydrogen, alkyl with 1 to 4 carbon atoms or acyl with 1 to 4 carbon atoms.

The compounds represented by formula I are mixtures of oligomers with a range of molecular weights. The residues A are linked by (—CH$_2$—) or [—CH$_2$(OCH$_2$)$_m$OCH$_2$—] groups, these two linking groups being connected only to a residue A and not to each other. The groups (—CH$_2$X) are connected to a residue A.

Preferably greater than 50 mol % of residues A are derived from naphthalene; most preferably more than 75 mol % of residues A are derived from naphthalene.

Oligomers which are preferred are those having a number average weight of 300 to 3500, more preferably those having a number average molecular weight of 350–1500, most preferably 400 to 1000. It is preferred that the naphthalene residues are linked by (—CH$_2$OCH$_2$—) and that these links should be attached to the positions 1,4; 1,5; 1,6; 1,7; 2,5; 2,6 or 2,7 on the naphthalene residue. It is most preferred that the links should be attached to the 1,4 or 1,5 positions on the naphthalene residue.

Non-limiting examples of particular oligomers of structure II are those linked by the group —CH$_2$OCH$_2$— and having two or more —CH$_2$X groups per molecule. Preferred structures which can be present as a component of the oligomer mixture are shown below. The group —CH$_2$OCH$_2$— being counted as a —CH$_2$X group.

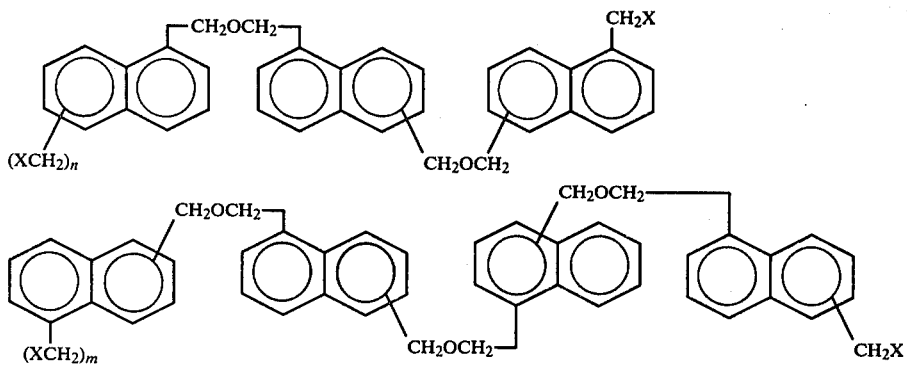

Where m=0 or 1, and X=OH

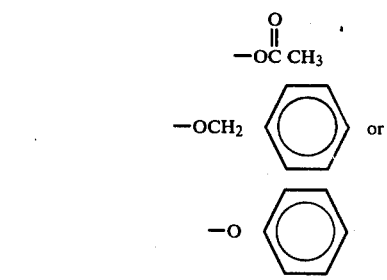

Specific Examples of oligomers which can be present as components of the oligomer mixture are listed in Table A

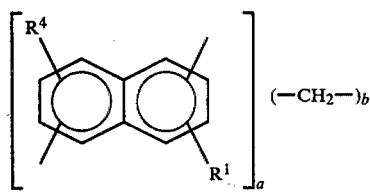

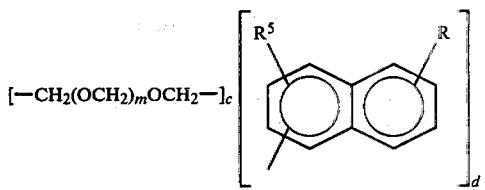

Table A

| No | a | b | c | n | d | R⁴ | R¹ | R⁵ | R |
|---|---|---|---|---|---|---|---|---|---|
| 1 | 0 | 0 | 1 | 0 | 2 | — | — | — | —CH$_2$OH |
| 2 | 1 | 1 | 1 | 0 | 2 | — | — | — | —CH$_2$OCH$_3$ |
| 3 | 2 | 1 | 2 | 0 | 2 | —CH$_3$ | — | CH$_3$ | —CH$_2$OH |
| 4 | 3 | 2 | 2 | 0 | 2 | —CH$_2$Br | — | —CH$_2$Br | —CH$_2$OH |
| 5 | 4 | 1 | 4 | 0 | 2 | —CH$_3$ | — | CH$_3$ | —CH$_2$OCH$_3$ |
| 6 | 5 | 1 | 5 | 0 | 2 | — | — | — | —CH$_2$OCCH$_3$ (O) |
| 7 | 6 | 2 | 5 | 3 | 2 | — | — | — | —CH$_2$OH |
| 8 | 8 | 2 | 6 | 0 | 2 | CH$_3$ | CH$_3$ | CH$_3$ | —CH$_2$OCCH$_3$ (O) |
| 9 | 8 | 1 | 8 | 0 | 2 | — | — | — | —CH$_2$OCH$_2$—C$_6$H$_5$ |
| 10 | 5 | 1 | 5 | 6 | 2 | — | — | — | —CH$_2$OH |
| 11 | 1 | 0 | 2 | 0 | 2 | — | — | — | —CH$_2$OH |

X represents OH or a derivative thereof. Non-limiting examples of derivatives include —OR,

—OCR, phenoxy, benzyloxy, or alkylphenoxy. Other examples of such derivatives may be represented by the formulae

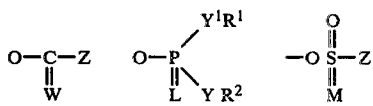

Where W is O, S, NH or NR¹, but is preferably O, Z is H, R, OR¹, SR, NH$_2$, NH—R¹—, N R¹, N R¹ R², but preferably is H or R. Y, Y¹, are independently O, NH,

—S—, or are absent but preferably O or S. L is O or S or absent, but is preferably O. M is O or is absent, but is preferably O R represents a straight or branched chain alkyl having 1 to 12 carbon atoms, preferably 2 to 4, cycloalkyl or cycloalkenyl having 5 to 12, preferably 6, carbon atoms. R may be optionally substituted by one or more halogen, hydroxy, epoxy, nitro, amine, amide, ether, carboxyl or ester groups or combinations thereof, but is preferably unsubstituted. R¹ and R² have the same significance as R and may be the same or different. However, X is preferably —OH—, —OCH$_3$; —OC$_6$H$_5$, $$-O\overset{O}{\underset{\|}{C}}CH_3,$$

and most preferably is OH.

The phosphorus acids include derivatives of phosphoric acid, phosphonic acid, phosphinic acid, phosphorous acid or their dehydration products. The acid groups in partial esters may be present as free acid groups, but preferably as their salts, e.g. as alkali metal or ammonium salts.

Non limiting examples of the phosphorus esters based on phosphoric acid are:

1 triphenyl phosphate
2 cresyl diphenyl phosphate
3 phenyl xylyl phosphate
4 tri-tolyl phosphate
5 tri-xylyl phosphate
6 tri-ethyl phenyl phosphates and phenyl/ethylphenyl phosphates
7 phenyl/isopropyl phenyl phosphates (for example those sold under the trade name Reofos 95, 65 and 50, and prepared as described in U.K. Patent No. 1,146,173).
8 phenyl/sec-butyl phenyl phosphates
9 phenyl/p-t-butyl phenyl phosphates
10 di(o-cumyl phenyl)phenyl phosphate
11 di(p-benzyl phenyl)phenyl phosphate
12 tri-(p-t-butyl phenyl)phosphate
13 tri-(p-nonyl phenyl)phosphate
14 tri-(p-t-amyl phenyl)phosphate
15 tri-(p-chlorophenyl)phosphate
16 tri-[o-(bromo isopropyl)phenyl]phosphate
17 tri-[p-(bromo isopropyl)phenyl]phosphate
18 diphenyl hydrogen phosphate
19 di(o-isopropyl phenyl)hydrogen phosphate
20 phenyl di-hydrogen phosphate sodium salt
21 diphenyl hydrogen phosphate sodium salt
22 diphenyl-(2-bromoethyl)phosphate
23 diphenyl-(2-chloroethyl)phosphate
24 diphenyl-(2,3-dibromopropyl)phosphate
25 diphenyl-(2,3-dichloropropyl)phosphate 26 diphenyl-n-octyl phosphate
27 diphenyl-n-decyl phosphate
28 phenyl n-octyl hydrogen phosphate ammonium salt
29 phenyl(2,3-dibromopropyl)phosphate potassium salt
30 phenyl di(2-bromoethyl)phosphate
31 phenyl di(2-chloroethyl)phosphate
32 phenyl di(2,3-dichloropropyl)phosphate
33 phenyl di(2,3-dibromopropyl)phosphate
34 phenyl di-n-octyl phosphate
35 phenyl di-n-decyl phosphate
36 di-n-decyl hydrogen phosphate
37 di(2-bromoethyl)hydrogen phosphate sodium salt
38 2,3-bromopropyl methyl hydrogen phosphate
39 tri(2-chloroethyl)phosphate
40 tri(2-bromoethyl)phosphate
41 tri(2,3-dibromopropyl)phosphate
42 tri(2,3-dichloropropyl)phosphate
43 tri-octyl phosphate
44 tri-decyl phosphate
45 tri-allyl phosphate

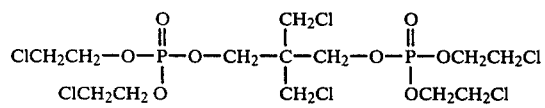

Non limiting examples of esters based on phosphonic acid are:

47 diphenyl phenyl phosphonate
48 di-(p-bromophenyl)phenyl phosphonate
49 di-(p-t-butyl phenyl)phenyl phosphonate
50 di-(o-isopropyl phenyl)phenyl phosphonate
51 di-(p-benzyl phenyl)phenyl phosphonate
52 diphenyl styryl phosphonate
53 diphenyl-1,2-dibrom-2-phenyl ethyl phosphonate
54 diphenyl n-octyl phosphonate
55 diphenyl n-decyl phosphonate
56 di-(p-chlorophenyl)n-butyl phosphonate
57 di-(p-bromophenyl)n-hexyl phosphonate
58 di-(o-isopropyl phenyl)n-octyl phosphonate
59 phenyl n-octyl n-hexylphosphonate
60 phenyl styryl hydrogen phosphonate or its sodium salt
61 phenyl phenyl hydrogen phosphonate
62 phenyl n-octyl phosphonic acid ammonium salt
63 bis-2,3-dibromopropyl-2,3-dibromo propyl phosphonate
64 di-ethyl(2-carbamoyl-N-hydroxymethyl)ethyl phosphonate
65 di-ethyl, di-ethanolamino methyl phosphonate Non limiting examples of esters based on phosphinic acid are:

66 n-octyl di-styryl phosphinate
67 n-octyl di-(1;2-dibromo-2-phenyl ethyl)phosphinate
68 phenyl di-styryl phosphinate
69 n-decyl di-styryl phosphinate Non limiting examples of esters based on phosphorous acid are:

70 triphenyl phosphite
71 tri octyl phosphite
72 tri-p-nonyl phenyl phosphite
73 tri-2:3 dibromopropyl phosphite
74 diphenyl hydrogen phosphite
75 dioctyl hydrogen phosphite Non limiting examples of esters based on phosphonic acid are:

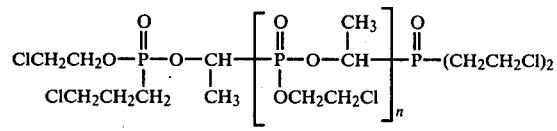

Preferred compounds are the esters of pentavalent phosphorus and, more particularly, triaryl phosphates and tri-halo-alkyl phosphates, for example compounds 1 to 11 and 39 to 42.

The compositions of the invention may contain components a and b in the ratios a:b from 0.1 to 10 to 0.1, but preferably from 1:10 to 10:1, more preferably 1:5 to 5:1, most preferably 1:5 to 3:1.

The amount of (a) together with (b) which can be used per hundred parts of polymer is from 0.1 to 150 parts, preferably 2-100 parts, more preferably 5 to 50 parts, most preferably 5-25 parts by weight. The actual amounts of (a) plus (b) used will vary depending on the particular homopolymer, copolymer or poly blend used and on the type and amount of other ingredients which may be present, such as filler and reinforcing fibres (described hereinafter).

The polymers may be homo or copolymers or polyblends of chlorine containing aliphatic polymers containing at least 5% chlorine, preferable more than 20% chlorine and most preferably more than 40% chlorine. Non-limiting examples of such polymers are polyvinyl chloride, chlorinated polybutene, poly-chloroprene, poly-vinylidene chloride, chlorinated poly -4,4-dimethyl pentene, chlorinated polyethylene, chlorinated polypropylene, also chlorinated polyethylene containing some chlorosulphonyl groups, e.g. those products sold under the trade name "Hypalon". Non-limiting examples of copolymers are vinyl chloride/vinyl acetate, vinyl chloride/vinylidene chloride, vinyl chloride/ethylene, vinyl chloride/propylene, vinyl chloride/acrylic ester copolymers, vinyl chloride/acrylonitrile, chlorinated ethylene/propylene copolymers, chlorinated ethylene/butene copolymers. Poly blends with other polymers may be used, non-limiting examples of which are PVC/rubber blends, in particular blends of PVC with an acrylonitrile based rubber.

Non-limiting examples of mixtures of (a) and (b) which may be used with the polymers are listed below in Table B.

Table B

| Example No. | Oligomer No. (b) | Phosphorus Ester (a) |
|---|---|---|
| 1 | 1 | Reofos 95 |
| 2 | 2 | Triphenyl phosphate |
| 3 | 3 | Tributyl phosphate |
| 4 | 4 | Tris (2-chloroethyl) phosphate |
| 5 | 5 | Diphenyl 2-chloroethyl phosphate |
| 6 | 11 | Phenyl bis (2-chloroethyl) phosphate |
| 7 | 7 | Cresyl diphenyl phosphate |
| 8 | 8 | Diphenyl isodecyl phosphate |
| 9 | 9 | Diphenyl octyl phosphate |
| 10 | 9 | Tri-octyl phosphate |
| 11 | 3 | Reofos 95/tris (2-chloroethyl) phosphate |
| 12 | 4 | Reofos 95/diphenyl decyl phosphate |
| 13 | 5 | Reofos 95/diphenyl octyl phosphate |
| 14 | 7 | Diphenyl decyl phosphate/tris (2-chloroethyl) phosphate |
| 15 | 11 | Diphenyl octyl phosphatic/tris (2-chloroethyl) |

Table B-continued

| Ex.-ample No. | Oligomer No. (b) | Phosphorus Ester (a) |
|---|---|---|
| | | phosphate |
| 16 | 5 | Diphenyl octyl phosphate/tris (2,3-dibromopropyl) phosphate |
| 17 | 11 | Reofos 50/diphenyl decyl phosphate |
| 18 | 11 | Reofos 95/diphenyl decyl phosphate |

Compounds of type (b) may optionally be mixed with other non-deactivated aromatic compounds containing vacant positions on an aromatic ring, such as compounds of the formula $ACH_2X$ where A and X are as defined above. In some cases further enhancement of fire retardance may be obtained thereby. Non-limiting examples of such compounds are:

4,4¹-di-acetoxy diphenyl methane
4,4¹-di-methoxy diphenyl methane
2,2-bis-(p-acetoxyphenyl)-propane
2,2-bis-(p-methoxyphenyl)-propane
1,5-di-acetoxy naphthalene
1,5-di-methoxy naphthalene
1-acetoxy-4-phenyl benzene
1-acetoxy-2-phenyl benzene
1-hydroxymethyl naphthalene
1-hydroxymethyl-4-phenyl benzene
diphenyl ether
biphenyl
terphenyl
polybenzyl
Novolaks
polyphenyl ethers
4-hydroxymethyl biphenyl
4-hydroxymethyl diphenyl ether
4-methoxymethyl diphenyl ether
4-acetoxymethyl diphenyl ether
1-hydroxymethyl-2-phenyl benzene
1,5-hydroxymethyl naphthalene mono-methyl mono-hydroxymethyl naphthalenes mono-hydroxymethyl phenanthrene Mixtures of phosphorus esters can be used, if desired, as can mixtures of compounds of formula I.

The compositions of the invention may also contain other ingredients. For example, they may contain heat stabilisers, light stabilisers, antioxidants, fillers, pigments, lubricants, blowing agents, fungicides, Friedel Crafts catalysts or precursors thereof, extenders, other processing aids and other fire retardant additives, and smoke suppressants. Suitable antioxidants include the sterically hindered phenol compounds for example: 2,2'-thio-bis-(4-methyl-6-tert. butyl-phenol), 4,4'-thio-bis-(3-methyl-6-tert. butylphenol), 2,2'-methylene-bis(4-methyl-6-tert. butylphenol), 2,2'-bis(4,4'-phenylol) propane, 2,2'-methylene-bis-(4-ethyl-6-tert. butylphenol), 4,4'-methylene-bis-(2-methyl-6-tert. butyl-phenol), 4,4'-butylidene-bis-(3-methyl-6-tert. butylphenol), 2,2'-methylene-bis[4-methyl-6-(α-methyl-cyclohexyl)-phenol], 2,6-di(2-hydroxy-3-tert. butyl-5-methylbenzyl) 4-methyl-phenol, 2,6-di-tert.butyl-4-methylphenol, 1,1,3-tris-(2-methyl-4-hydroxy-5-tert.butyl-phenyl)-butane, 1,3,5-trimethyl-2,4,6-tri(3,5-di-tert.butyl-4-hydroxy-benzyl)-benzene, esters of β-4-hydroxy-3,5-di-tert.butylphenylpropionic acid with monohydric or polyhydric alcohols, such as methanol, ethanol, octadecanol, hexanediol, nonanediol, thiodiethylene glycol, trimethylolethane or pentaerythritol, 2,4-bis-octylmercapto-6-(4-hydroxy-3,5-di-tert.butylanilino)-s-triazine, 2,4-bis-(4-hydroxy-3,5-di-tert.butylphenoxy)6-octylmercapto-s-triazine, 1,1-bis(4-hydroxy-2-methyl-5-tert.butylphenyl)-3-dodecyl-mercapto-butane, 2,6-di-t-butyl-p-cresol, 2,2-methylene-bis(4-methyl-6-t-butyl-phenol),4-hydroxy-3,5-di-tert.butylbenzyl-phosphonic acid esters, such as the dimethyl, diethyl or dioctadecyl ester, (3-methyl-4-hydroxy-5-tert.butyl benzyl)-malonic acid dioctadecyl ester, s-(3,5-dimethyl-4-hydroxyphenyl)-thioglycollic acid octadecyl ester, and esters of bis-(3,5-di-tert.butyl-4-hydroxybenzyl)-malonic acid, such as the didodecyl ester, the dioctadecyl ester and 2-dodecylmercaptoethyl ester.

Suitable light stabilisers and uv absorbers include: sterically hindered cyclic amines of the formula II

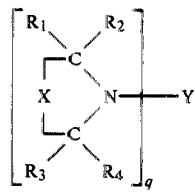

and salts thereof in which q is 1 or 2, X represents an organic grouping which complements the nitrogen-containing ring to give a 5-membered, 6-membered or 7-membered ring, $R_1$ and $R_2$ represent methyl or together represent $-(CH_2)_5-$, $R_3$ represents methyl, $R_4$ represents alkyl with 1-5 carbon atoms or together with $R_3$ represents the radicals $-(CH_2)_4-$, $-(CH_2)_5-$, $-CH_2-C(CH_3)_2-NH-C(CH_3)_2-CH_2-$ or $-CH_2-C(CH_3)_2-N(O\cdot)-C(CH_3)_2-CH_2-$ and, if q is 1, Y denotes hydrogen, $-O\cdot$, hydroxyl, alkyl, substituted alkyl, alkenyl, alkynyl, aralkyl, substituted aralkyl or acyl or, if q is 2, Y denotes alkylene, alkenylene, alkynylene, cycloalkylene or aralkylene.

Examples of sterically hindered cyclic amines of formula II are 4-benzoyloxy-, 2,2,6,6-tetramethylpiperidine; 4-caproyloxy-2,2,6,6-tetramethylpiperidine; 4-stearoyloxy-2,2,6,6-tetramethylpiperidine; bis-(2,2,6,6-tetramethyl-4-piperidyl)-sebacate; bis-(2,2,6,6-tetramethyl-4-piperidyl)-dodecanedioate and bis-(1,2,2,6,6-pentamethyl-4-piperidyl)-sebacate.

2-(2'-Hydroxyphenyl)-benztriazoles, such as for example, the 5'-methyl-, 3',5'-di-tert.butyl-, 5'-tert.butyl-, 5'-(1,1,3,3-tetramethylbutyl)-, 5-chloro-3',5'-di-tert.butyl-, 5-chloro-3'-tert.butyl-5'-methyl-, 3'-sec.butyl-5'-tert.-butyl-, 3'-α-methylbenzyl-5'-methyl-, 3'-α-methylbenzyl-5'-methyl-5-chloro-, 4'-hydroxy-, 4'-methoxy-, 4'-octoxy-, 3',5'-di-tert.amyl-, 3'-methyl-5'-carbomethoxyethyl- and 5-chloro-3',5'-di-tert.-amyl-dervative.

2,4-Bis-(2'-hydroxyphenyl)-6-alkyl-s-triazines, such as for example, the 6-ethyl-, 6-heptadecyl- or 6-undecyl-derivative.

2-Hydroxy-benzophenones, such as, for example, the 4-hydroxy-, 4-methoxy-, 4-octoxy, 4-decyloxy, 4-dodecyloxy-, 4-benzyloxy-, 4,2',4'-trihydroxy- or 2'-hydroxy-4,4'-dimethoxy-derivative.

1,3-Bis-(2'-hydroxybenzoyl)-benzenes, such as, for example, 1,3-bis-(2'-hydroxy-4'-hexyloxy-benzoyl)-benzene, 1,3-bis-(2'-hydroxy-4'-octyloxy-benzoyl)-benzene and 1,3-bis-(2'-hydroxy-4'-dodecyloxy-benzoyl)-benzene.

Esters of optionally substituted benzoic acids, such as, for example, phenyl salicylate, octylphenyl salicylate dibenzoylresorcinol, bis-(4-tert.-butylbenzoyl)-resorcinol, benzoylresorcinol and 3,5-di-tert.-butyl-4- hydroxybenzoic acid 2-di-tert.-butyl-phenyl ester or octadecyl ester or 2-methyl-4,6-tert.butyl-phenyl ester.

Acrylates, such as, for example, α-cyano-β,β-diphenylacrylic acid ethyl ester of isooctyl ester, α-carbomethoxycinnamic acid methyl ester, α-cyano-β-methyl-p-methoxy-cinnamic acid methyl ester or butyl ester and N-(β-carbomethoxy-vinyl)-2-methyl-indoline.

Oxalic acid diamides, such as, for example, 4,4'-dioctyloxy-oxanilide, 2,2'-di-octyloxy-5,5'-di-tert.-butyl-oxanilide, 2,2'-di-dodecyloxy-5,5'-di-tert.butyl-oxanilide, 2-ethoxy-2'-ethyl-oxanilide, N,N'-bis-(3-dimethylaminopropyl)-oxalamide, 2-ethoxy-5-tert.butyl-2'-ethyl-oxanilide and its mixture with 2-ethoxy-2'-ethyl-5,4'-di-tert.butyl-oxanilide and mixtures of ortho- and para-methoxy- as well as of o- and p-ethoxy-disubstituted oxanilides.

Nickel compounds, such as, for example, nickel complexes of 2,2'-thio-bis-[4-(1,1,3,3-tetramethylbutyl)-phenol], such as the 1:1 or 1:2 complex, optionally with additional ligands, nickel complexes of bis-[2-hydroxy-4-(1,1,3,3-tetramethylbutyl)-phenyl]-sulphone, such as the 2:1 complex, optionally with additional ligands such as 2-ethyl-caproic acid, nickel dibutyldithiocarbamate, nickel salts of 4-hydroxy-3,5-di-tert, butylbenzyl-phosphonic acid monoalkyl esters, such as the methyl, ethyl or butyl ester, nickel complexes of ketoximes such as 2-hydroxy-4-methyl-phenyl-undecylketonoxime and nickel 3,5-di-tert.butyl-4-hydroxy-benzoate.

The compositions may for example contain, as stabilisers:
tribasic lead sulphate
basic lead carbonate
basic lead phosphite
lead stearate
basic lead stearate
cadmium laurate
cadmium stearate
cadmium 2-ethyl hexoate
cadmium benzoate
barium laurate
barium stearate
barium phenate
barium alkyl phenates
calcium laurate
calcium stearate
zinc stearate
zinc laurate
zinc 2-ethyl hexoate or other metal salts of branched chain fatty acids
dibutyl tin dilaurate
dibutyl tin thio diglycolate
dibutyl tin thio carboxylate esters
dibutyl tin maleate
other alkyl tin based stabilisers
alkylβamino crotonates and αbis crotonates
thio alkylβamino crotonates and αbis crotonates
α-phenyl indole
epoxidised soya bean oil (for example, the product sold under the Trade Name Reoplas 39)
other epoxy aliphatic or aromatic esters
glycidyl ethers These stabilisers may be used alone or in any combination. While not essential, where feasible, lowered levels of stabiliser have been found to further increase the flame retardance of the compositions described.

Preferred heat stabilisers are the organotin stabilisers, e.g. dibutyl tin maleate and epoxide stabilisers, e.g. epoxidised soya bean oil (such as that sold under the Trade Name Reoplas 39).

They may also be used with other stabilising and lubricating components, such as:
pentaerythritol
triphenyl phosphite
decyl diphenyl phosphite
didecyl phenyl phosphite
trinonyl phenyl phosphite
stearic acid
hydroxy stearic acid
"Low⇌ molecular weight polyethylene wax
paraffin wax
oxidised paraffin wax
fatty alcohols
esters of straight chain fatty alcohols and straight chain fatty acids (in which the acids or alcohols are natural or synthetic)
monoesters of glycols and straight chain fatty acids
methylene bis stearamide Suitable pigments include organic and inorganic pigments or mixtures thereof. If an organic pigment is used it may be, for example, a phthalocyanine which may be a metal phthalocyanine such as copper phthalocyanine, a metal free phthalocyanine or a chlorinated metal or metal free phthalocyanine, for example a chloromethylated phthalocyanine. Other organic pigments include azo pigments (monoazo or diazo) azo metal salts, anthraquinone and metal complexes. If an inorganic pigment is used it may be, for example, titanium dioxide, carbon black or iron oxide.

The addition of Friedel Crafts catalysts to the composition can in some cases give a marked increased in fire retardance. This effect is particularly observed with aromatic chloromethyl additives.

Suitable Friedel Crafts catalysts either Brönsted or Lewis acids include aluminium chloride, zinc chloride, ferric chloride, magnesium chloride, stannous chloride, stannic chloride, butyl tin trichloride, phosphoric acid, p-toluene sulphonic acid. In addition a latent catalyst may be used, e.g. one which is converted to a Friedel Crafts catalyst by heat or by released hydrogen chloride on thermal decomposition of the vinyl chloride polymer. Such latent catalysts include zinc carbonate, stannous octoate, stannous oxalate and tri-alkyl phosphates.

Suitable fillers include asbestos, glass fibres, kaolin and talc.

Suitable secondary plasticisers or extenders are chlorinated paraffin sold under the trade name Cereclor, styrene resin sold under the trade name Dow Resin 276-V2 and hydrocarbon derivatives sold under the trade name Iranolin PDL18.

Other conventional fire retardant additives may be present, such as antimony oxide.

Examples of smoke suppressants which may be present include ferrocene, aluminium hydrate and tetraphenyl lead.

Mixtures of the phosphorus acid esters can be used, if desired, together with one or more known phosphorus-free plasticisers, e.g. as mixtures of phosphate and phthalate esters or mixtures of phosphate and adipate esters.

However, preferably the phosphorus acid ester is present in a concentration of at least 50%, most preferably in a concentration of 75% in such mixtures. However, where certain haloalkyl phosphates are used alone or in mixtures with aryl phosphates, satisfactory results can be obtained with up to 90% phosphorus-free plasticiser.

Non limiting examples of phosphorus-free plasticisers which can be used in conjunction with compositions described in the invention are:
di(butoxy ethyl) adipate
di-2-ethylhexyl adipate
Linevol 7 9 adipate
di-isooctyl adipate
di-capryl adipate
di-nonyl adipate
isooctyl, isodecyl adipate
Linevol 9 11 adipate
di-isodecyl adipate
poly (butylene adipate)
di-2-ethylbutyl azelate
di-2-ethylhexyl azelate
bis (dimethyl benzyl)ether
o-nitro diphenyl
polyethylene glycol monophenyl ether
toluene N-ethyl sulphonamide
di(α-phenylethyl)ether
di-capryl azelate
di-n-butyl sebacate
di-alphol-7,9-sebacate
di-iso-octyl sebacate
di-capryl sebacate
di-nonyl sebacate
tri-ethylene glycol di-caprylate
iso-octyl iso-decyl esters of AGS acids
iso-octyl epoxy stearate
nonyl esters of AGS acids
iso-octyl esters of AGS acids
iso-decyl esters of AGS acids
n-heptyl esters of AGS acids
di-iso-decyl succinate
butoxethyl diglycol carbonate
tributyl citrate
acetyl triethyl citrate
acetyl tributyl citrate
acetyl tri(2-ethylhexyl) citrate
2,2(2-ethylhexamide) diethyl di(2-ethylhexoate)
polyethylene glycol di-2-ethylhexoate
2-butoxyethyl oleate
tetrahydrofuryl oleate
di-n-butyl phthalate
di-isobutyl phthalate
di-2-ethyl butyl phthalate
iso butyl nonyl phthalate
di-n-heptyl phthalate
di-2-ethyl hexyl phthalate
di-isooctyl phthalate
di-capryl phthalate
di-n-octyl phthalate
isooctyl isodecyl phthalate
"Linevol" 7 9 phthalate
"Linevol 9 11" phthalate
("Linevol" 7 9 and "Linevol" 9 11 are mixtures of predominantly straight chain aliphatic alcohols containing 7 to 9, and 9 to 11 carbon atoms respectively).
di-2-phenylethyl phthalate
di-tri-decyl phthalate
butyl benzyl phthalate
di-methyl glycol phthalate
tri-isooctyl tri mellitate
butyl phthalyl butyl glycolate
tri-cotyl tri mellitate
di-benzyl phthalate
di-phenyl phthalate
di-2-phenoxyethyl phthalate
tri-phenyl tri mellitate
tetra-phenyl pyromellitate
ethyl benzoyl benzoate
di-propylene glycol dibenzoate
benzyl benzoate
diphenoxyethyl diglycolate
bis(phenyl polyethylene glycol)diglycolate
phenoxyethyl laurate
phenoxyethyl oleate
di-phenyl adipate
di-benzyl adipate
benzyl octyl adipate
octyl phenyl adipate
butyl benzyl adipate
dibutoxyethyl sebacate
di (2-ethylhexyl) sebacate
2-butoxyethyl stearate
acetophenone
epoxy plasticisers, such as
   epoxidised fatty glycerides
   polymeric epoxy plasticisers
   epoxidised ethylhexyl oleate
aliphatic nitriles
di-benzyl sebacate
di-(2-phenoxy ethyl) adipate
butyl benzyl sebacate
n-octyl n-decyl phthalate/succinate
phenyl diglycol carbonate
cresyl diglycol carbonate
bis-(dimethyl benzyl) carbonate
di-ethylene glycol dibenzoate
dipropylene glycol dibenzoate
tribenzylcitrate
alkyl-sulphonate esters of phenols, e.g. products sold under the trade name "Mesamoll".
o-cresyl-p-toluene sulphonate In addition, various polyesters may be used, for example, polyesters derived from adipic acid and a glycol end-stopped with an alcohol or mono-basic acid; polyesters derived from AGS acids (a commercial mixture of adipic, glutaric and succinic acids) and a glycol end-stopped with an alcohol or mono-basic acid; polyesters derived from phthalic anhydride and one or more glycols, optionally end stopped by an alcohol or mono-basic acid; polyesters derived from a mixed phthalic-/adipic acid and a glycol, optionally end stopped by an alcohol or mono-basic acid; polyesters derived from mixed phthalic/AGS acids and a glycol, optionally end stopped by an alcohol or mono-basic acid. In addition, polyesters of these types modifed by a lactone, e.g. ε-caprolactone may be used.

Examples of mixtures of esters of phosphorus acids with other plasticisers, stabilisers, fillers, etc. which can be used with the oligomers include the following listed in Table C.

Table C

| Example No. | Oligomer No. | Phosphorus ester, plasticisers and extenders |
|---|---|---|
| 1 | 11 | Reofos 95 + dioctyl phthalate |
| 2 | 2 | Reofos 95 + dioctyl adipate |
| 3 | 5 | Diphenyl decyl phosphate + dioctyl phthalate |
| 4 | 11 | Diphenyl decyl phosphate + dioctyl adipate |
| 5 | 6 | Diphenyl octyl phosphate + dioctyl |

Table C-continued

| Example No. | Oligomer No. | Phosphorus ester, plasticisers and extenders |
|---|---|---|
| | | phthalate |
| 6 | 11 | Diphenyl octyl phosphate + dioctyl adipate |
| 7 | 5 | Reofos 50 + dioctyl phthalate + chlorinated hydrocarbons or hydrocarbon extenders |
| 8 | 11 | Diphenyl decyl phosphate + dioctyl phthalate + chlorinated hydrocarbon or hydrocarbon extenders |
| 9 | 5 | Diphenyl decyl phosphate + tris (2-chloroethyl) phosphate + chlorinated hydrocarbon or hydrocarbon extenders |
| 10 | 6 | Diphenyl octyl phosphate + tris (2-chloroethyl)phosphate + dioctyl phthalate |
| 11 | 11 | Diphenyl octyl phosphate + polyester plasticisers + chlorinated hydrocarbon extenders |
| 12 | 5 | Diphenyl decyl phosphate + polyester plasticisers + chlorinated hydrocarbon extenders |
| 13 | 11 | Diphenyl decyl phosphate + polyester plasticisers + phthalate plasticisers |
| 14 | 11 | Phosphonates + phthalates |
| 15 | 11 | Alkyl aryl phosphates + phthalates |

In addition, any of the above combination or any sole phosphorus acid ester or mixture of phosphorus acid esters or combinations thereof with or without other optionally phosphorus-free plasticisers can be used with silica, barium metaborate, $Sb_2O_3$ and diluted forms thereof, $Al(OH)_3$ or "alumina trihydrate", carbon, calcium carbonates, clay fillers and stearic acid coated calcium carbonate taken singly or in any combination.

When combinations of esters or plasticisers are used, the proportions can be varied over a wide range and will normally depend on the end use to which the polymer is to be put and, for example, whether a black or clear polymer is desired. Such variations will be readily apparent to those skilled in the art.

The oligomers of the present invention can be prepared by conventional methods; examples of which are:
a the reaction of naphthalene with formaldehyde in the presence of an acid catalyst to produce oligomers with structures having predominently methylene ($-CH_2-$) and acetal ($-(CH_2O)_n-CH_2-$) links with some di-methylene ether links ($-CH_2-O-CH_2-$), or
b by the chloromethylation of naphthalene to produce mixtures of mono, di and higher chloromethyl naphthalenes which are then hydrolysed and oligomerised to produce oligomers having predominently di-methylene ether ($-CH_2-O-CH_2-$) and methylene ($-CH_2-$) links, or
c by reacting a chloromethylated aromatic compound, e.g. benzyl chloride, with formaldehyde or a precurser thereof, such as trioxymethylene and an acid catalyst to give a chloromethylated diaryl methane, e.g. bis-chloromethyl di-phenylmethane. The latter are hydrolysed and oligomerised with aqueous sodium carbonate or are converted, via the acetoxymethyl compounds, into the hydroxymethyl derivatives and then oligomerised with an acid catalyst.

General methods of preparation of the oligomers used in the Examples below are as follows:

Chloromethylation (see Table 1)

This reaction is carried out in an efficient fume cupboard because of the possible formation of bis-chloromethyl ether in the vapour phase above the reaction mixture.

A 5 liter four-neck round bottom flask is fitted with a stirrer, thermometer, gas inlet tube and a reflux condenser. The off-gas from the reaction is conveyed to a scrubber in which 2 liters of water is continuously circulated and maintained alkaline to phenolphthalein by addition of 46% w/w aqueous sodium hydroxide as required.

The reactants specified in Table 1 are charged to the flask and heated and stirred at 90° C. for the time required to achieve the desired level of chloromethylation. During this period, hydrogen chloride gas is passed into the reaction mixture at the rate indicated in Table 1. The progress of chloromethylation is monitored by NMR analysis.

Passage of hydrogen chloride and stirring is stopped and the reaction mixture allowed to cool to room temperature. The aqueous layer is removed and the crude product washed with two 1000 g. portions of cold water. The crude product is an off-white solid.

Hydrolysis of chloromethylated naphthalene using aqueous sodium carbonate (see Table 2)

To the crude chloromethylated naphthalene is added the amount of anhydrous sodium carbonate specified in Table 2 and 786 g. of water for every g. mol. of anhydrous sodium carbonate. The reaction mixture is stirred and heated at 100° C. for eight hours.

The amount of sodium hydroxide given in Table 2 is then added as a 46% w/w aqueous solution, and heating and stirring at 100° C. continued for a further six hours. The mixture is allowed to cool and the aqueous phase removed by decantation. The organic phase is washed twice with water at 60° C. and finally dried by heating and stirring for three hours at 110° C. and 20 mm. mercury pressure.

Oligomers derived from hydroxymethyl naphthalenes or hydroxymethyl naphthalene oligomers (Table 3)

The hydroxymethyl compound is heated in toluene (about 13% w/w) with 88% phosphoric acid (1% w/w) as catalyst. The amounts of toluene and phosphoric acid are calculated with respect to the amount of hydroxymethyl compound. The reaction is carried out in a flask fitted with a stirrer, thermometer, and a water separator surmounted by a reflux condenser. The reaction times at 150° C. and the amounts of water removed by the water separator are given in Table 3.

The reaction mixture is allowed to cool, diluted with chloroform, washed twice with water, and the solvent removed by heating in a distillation apparatus under reduced pressure. The product is finally stripped at 110° C. for three hours at 20 mm. mercury pressure.

Conversion of chloromethyl naphthalenes into the corresponding acetoxymethyl derivatives (Table 4)

The reactants given in Table 4 are stirred under reflux at 122° C. for nine hours. After cooling to room temperature the reaction mixture is filtered and the white precipitate washed with hot acetic acid. The filtrate and washings are then stripped under 20 mm. mercury pressure up to a maximum internal temperature of 100° C. The residual crude product is then stirred with dichloromethane at room temperature, filtered, the precipitate washed with dichloromethane and the combined filtrate and washings stripped under a pressure of 20 mm. mercury up to an internal temperature of 100° C. to leave the product as the distillation residue.

Hydrolysis of acetoxymethyl naphthalenes to the corresponding hydroxymethylnaphthalenes (see Table 5)

The hydrolysis is carried out by refluxing the acetoxymethyl naphthalene with its own weight of ethanol in the presence of 20% aqueous sodium hydroxide for four to nine hours. The reaction mixture is then diluted with water and cooled to room temperature. The mixture is extracted with ether, the latter washed several times with water and then dried over sodium sulphate. The ether is removed by distillation and the residual product finally stripped for one hour at 100° C. and 20 mm. mercury pressure.

1,5 Bis-acetoxymethyl naphthalene was purified using the conditions shown in Table 6. In Table 7 oligomers prepared from various aromatic compounds are listed.

Table 1

Chloromethylation of naphthalene

| Preparation No. | Naphthalene | Conc. HCl (HCl gas flow rate ml/min.) | Formaldehyde - as 37% aqueous solution (p = paraformaldehyde) | Catalyst | Reaction time (hours) | Moles - CH$_2$Cl/ mole naphthalene by H NMR |
|---|---|---|---|---|---|---|
| 1 | 4.0 | 13.8 (500-1,000) | 18.9 | — | 12 | 1.47 |
| 2 | 4.0 | 13.8 (340) | 16.0p +5.5p +4.17p — | — | 4 10 15 | 1.1 1.35 1.54 |
| 3 | 4.0 | 13.8 (320) | 18.9 +9.0p — | — | 12 16 | 1.22 1.49 |
| 4 | 4.0 | 13.8 (230) | 18.9 — — 18.9 (aq. layer replaced) | ZnCl$_2$ (0.19) | 6 12 17 22 | 1.02 1.4 — 1.88 |
| 5 | 4.0 | 13.9 (500) | 18.9 | ZnCl$_2$ (0.04) | 8 | 1.26 |
| 6 | 4.0 | 13.8 (450) | 18.9 | — | 12 | 1.5 |
| 7 | 4.0 | 13.8 | 18.9 — 18.9 (aq. layer replaced) — 18.9 — 10.0p — | — | 7.5 12.0 16.0 17.0 22.5 27.0 30.0 | 1.2 1.3 1.6 — 1.7 1.9 2.0 |
| 8 | 4.0 | 13.8 (500) | 16.0p +7.2p | ZnCl$_2$ (0.19) | 8 | 1.38 |
| 9 | 4.0 | 13.8 (500) | 16.0p +8.33p +8.13p | ZnCl$_2$ +0.76 +CH$_3$CO$_2$H | 5 10 15 | 1.38 1.6 1.93 |

Table 2

Hydrolysis of Chloromethylated Naphthalenes using aqueous sodium carbonate (reflux 100° C. for 14 hours)

| Preparation No. | Chloromethylated naphthalene(moles) Preparation No. | REACTANTS (MOLES) Na$_2$CO$_3$ | NaOH | Mole —CH$_2$OH/ mole | % Oxygen | % Monohydroxy methyl naphthalene | % Bis hydroxy methyl naphthalene | M Weight | Yield % |
|---|---|---|---|---|---|---|---|---|---|
| 10 | 1 (3.42) | 2.63 | 0.90 | 1.12 | 8.2 | 2.0 | 9.0 | 440 | 81 viscous liquid |
| 11 | 2 (1.0) | 0.77 | 0.26 | 1.36 | — | 8.0 | 2.0 | 325 | 78 viscous liquid |
| 12 | 3 (4.0) | 3.19 | 1.05 | 1.04 | 9.9 | 15.0 | 5.0 | 340 | 73 viscous liquid |
| 13 | 4 (3.85) | 3.57 | 1.35 | 1.38 | 13.1 | 15.0 | 15.0 | 380 | 73 very viscous liquid |
| 14 | 5 (3.84) | 3.17 | 1.08 | 1.03 | 2.0 | 30.0 | 3.0 | 280 | 77 viscous liquid |

Table 2-continued

Hydrolysis of Chloromethylated Naphthalenes using aqueous sodium carbonate (reflux 100° C. for 14 hours)

| Preparation No. | Chloromethylated naphthalene(moles) Preparation No. | REACTANTS (MOLES) Na$_2$CO$_3$ | NaOH | Mole —CH$_2$OH/ mole | % Oxygen | % Monohydroxy methyl naphthalene | % Bis hydroxy methyl naphthalene | M Weight | Yield % |
|---|---|---|---|---|---|---|---|---|---|
| 15 | 8 (4.0) | 3.09 | 1.62 | 0.82 | 8.9 | 10.0 | 2.5 | 385 | 81 viscous liquid |

Table 3

Oligomers derived from hydroxymethyl naphthalenes or oligomers (1% of H$_3$PO$_4$/toluene/150° C.)

| Preparation No. | Hydroxymethyl naphthalene Preparation No. | Amount H$_2$O removed (mole/mole of starting material) | Reaction time (hour) | Yield % | Mole CH$_2$OH/ mole | % oxygen | % monohydroxymethyl naphthalene | % bis-hydroxymethyl naphthalene | M Weight |
|---|---|---|---|---|---|---|---|---|---|
| 16 | 27 | 0.61 | 1.5 | 94 hard plastic | 0.54 | — | 5.0 | <1.0 | 530 |
| 17 | 15 | 0.47 | 4.5 | 84 brittle solid | 0.39 | 7.1 | 6.0 | 0.2 | 550 |
| 18 | 28 | 0.53 | 4.0 | 94 very viscous liquid | — | — | 15.0 | 1.0 | 530 |
| 19 | 11 | 0.77 | 0.75 | 78 powder | 0.11 | 7.0 | 0 | <1.0 | 760 |
| 20 | 29 | 0.49 | 9 (150°-200° C.) (3% H$_3$PO$_4$) | 93 yellow powder | 2.05 | 16.9 | 0 | 35 | 460 |
| 21 | 14 | 1.24 | 0.75 | 94 yellow powder | 0.34 | 1.2 | 0.5 | 1.0 | 600 |

Table 4

Conversion of chloromethyl naphthalenes into the corresponding acetoxymethyl derivatives

| Preparation No. | Chloromethylated naphthalene Preparation No. | REACTANTS (moles) CH$_3$CO$_2$K | CH$_3$CO$_2$H | Reaction time at 122° C. (hours) | Product |
|---|---|---|---|---|---|
| 22 | 7 (4.0) | 10.0 | 75.0 | 9 | Bis-acetoxymethyl naphthalene together with naphthalene oligomers. Brown viscous liquid |
| 23 | 2 (3.33) | 8.3 | 50.0 | 9 | Equimolar mixture of 1 and 1,5-bis-acetoxymethyl naphthalene |
| 24 | 6 (3.64) | 9.14 | 55.3 | 9 | Equimolar mixture of 1 and 1,5-bis-acetoxymethyl naphthalene |
| 25 | 9 (3.36) | 7.53 | 37.5 | 9 | 90% 1,5-bis acetoxymethyl naphthalene and 10% 1-acetoxymethyl napthalene |

Table 5

Hydrolysis of acetoxymethyl-naphthalene derivatives to the corresponding hydroxymethylnaphthalenes (reflux 4–9 hr. in aqueous ethanol with 20% NaOH)

| Preparation No. | Acetoxymethyl naphthalene (moles) Preparation No. | Sodium hydroxide (moles) | Yield % | Product |
|---|---|---|---|---|
| 26 | 22 (0.37) | 1.31 | 88 | Brown solid; mainly bis-hydroxymethyl naphthalenes + minor amounts of oligomers |
| 27 | 23 (2.11) | 7.54 | 94 | Semi-solid; equimolecular mixture of mono- and bis-hydroxymethyl naphthalenes |

Table 5-continued

Hydrolysis of acetoxymethyl-naphthalene derivatives to the corresponding hydroxymethylnaphthalenes
(reflux 4–9 hr. in aqueous ethanol with 20% NaOH)

| Preparation No. | Acetoxymethyl naphthalene (moles) Preparation No. | Sodium hydroxide (moles) | Yield % | Product |
|---|---|---|---|---|
| 28 | 24 (1.53) | 5.45 | 86 | Waxy solid; equimolar mixture of mono- and bis-hydroxymethyl naphthalenes |
| 29 | 30 (2.2) | 7.83 | 88 | Brown solid; melting point 107°–117° C.; bis-hydroxymethyl naphthalenes |

Table 6

Purification of 1,5-bis acetoxymethyl naphthalene
(removal of 1-acetoxymethyl naphthalene)

| Preparation No. | Composition of starting material (Wt. taken, g.) Preparation No. | VACUUM STRIPPING AT 1.5 mm. MERCURY PRESSURE | | | | | Weight of product g. (% yield) | T.L.C. analysis |
|---|---|---|---|---|---|---|---|---|
| | | fore-run fraction | boiling range (°C.) | % mono- | % bis-AcOCH$_2$-naph-thalene | Weight (g) | | |
| 30 | 25 | 1 | 150–156 | 93 | 7.4 | 21 | 597 | Mainly bis-AcOCH$_2$ naphthalene with traces of mono-AcOCH$_2$-naphthalene and oligomers |
| | | 2 | 156–160 | 88 | 12 | 31.9 | (86) | |
| | 90% 1,5- and | 3 | 160–170 | 73 | 27 | 15.3 | | |
| | 10% 1-acetoxy methyl | 4 | 170–200 | 7.2 | 93 | 21.5 | | |
| | naph- thalene (691) | 5 | 200 | 1.6 | 98 | 3.85 −93.55 | | |

Table 7

Oligomers from various aromatic compounds

REACTANTS (MOLS)

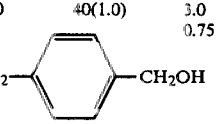

| Preparation No. | naphthalene | other | Para-formalde-hyde | % strength aqueous H$_2$SO$_4$ used | Reaction time (hour) | Yield (g) | Molecular weight | % oxygen |
|---|---|---|---|---|---|---|---|---|
| 31 | 0.9 | | 3.0 | 40(1.0) | 3.0 | 96.0 | 400 | 5.9 |
| 32 | 0.5 | C$_6$H$_5$ . OC$_6$H$_5$ 0.5 | 3.0 | 40(1.0) | 3.0 | 151 | 650 | 15.8 |
| 33 | — | Oligomer from HOCH$_2$—⟨ ⟩—CH$_2$OH with 1% NH$_2$SO$_3$H catalyst at 160° C. | | | 0.75 | 72% of theory | 440 | 17.0 |
| 34 | 0.5 | toluene 0.5 | 3.0 | 40(1.0) | 6.0 | 85.8 | 550 | 7.6 |
| 35 | 1.0 | CH$_3$CO$_2$H 1.0 | 3.0 | 45(1.0) | 4.0 | 150 | 500 | 6.3 |
| 36 | 0.9 | C$_6$H$_5$ . O . C$_6$H$_5$ 0.1 | 3.0 | 40(1.0) | 3.0 | 107 | 470 | 10.9 |
| 37 | 1.0 | CH$_3$OH 1.0 | 3.0 | 45(1.0) | 6.0 | 130 | 410 | 10.1 |
| 38 | — | C$_6$H$_5$ . O . C$_6$H$_5$ 1.0 | 3.0 | 40(0.75) | 4.5 | 124 | 890 | 19.6 |

Preparation of the naphthalene oligomers used in the formulations of Table 10 is exemplified by the following method.

A mixture of paraformaldehyde (114 g.) water (115 g.) and concentrated sulphuric acid (85 g.) was heated to 95° C. Naphthalene (120 g.) was added to the reaction mixture over 20 minutes at 90°–95° C. The mixture was then refluxed for 2 hours at 105° C. On cooling, the aqueous layer was decanted off and the product washed with dilute sodium carbonate solution to remove acid. Unreacted naphthalene was removed by steam distillation and the organic product was dissolved in toluene (300 mls.) separated, and dried on a rotary evaporator under water and then oil pump vacuum at 90° C. The product was a very viscous pale yellow liquid.

Yield = 120 g.

Analytical details of products are listed in Table 8.

Table 8

| Oligomer No. | Molecular Weight | % Oxygen |
| --- | --- | --- |
| 39 | 425 | 10.0 |
| 40 | 465 | 10.0 |
| 41 | 510 | 8.5 |
| 42 | 550 | 9.5 |

The invention is illustrated by the following Examples.

PVC compositions were made up using several different flame retardant compositions as set out in the Tables 8 to 13, the amounts of constituents being given in parts by weight. The compositions contained 100 parts PVC, and were compounded on a laboratory two roll mill for 15 minutes at 165° C. and then passed into sheets 6 inches×6 inches×0.100 inch in a heated press at 178° C. The sheets were then aged for 5 days at a constant temperature of 23° C. After this time the IRHD (International Rubber Hardness Degrees BS 903) and Oxygen Index (OI ASTM 2863) of the sheets were measured.

In order that comparisons can be made with compositions not containing compound (b) comparative examples are included.

EXAMPLES 1-8

By comparing Examples 1 to 8 with comparative Example A in Table 9, it can be seen that a great improvement in flame resistance as measured by Oxygen Index can be achieved. Also, Examples 1, 2, 5 and 6 have superior flexibility compared to comparative Example A.

Table 9

| | | | | Polyvinyl Chloride | | | |
| --- | --- | --- | --- | --- | --- | --- | --- |
| Example No. | Naphthalene Oligomer Preparation No. | M. Wt. | Parts of naphthalene oligomer | Phosphorus Ester (parts) | Stabiliser (parts) | TEST RESULTS O.I. | IRHD |
| 1 | 13 | 380 | 20 | Reofos 95 (50) | Dibutyl tin maleate (2) | 67.2 | 75.0 |
| A | — | — | — | Reofos 95 (50) | Dibutyl tin maleate (2) | 33.0 | 91 |
| 2 | 20 | 600 | 10 | Reofos 95 (50) | Dibutyl tin maleate (2) | 53.5 | 77.0 |
|   | 21 | 700 | 10 |  |  |  |  |
| 3 | 14 | 280 | 20 | Reofos 95 (50) | Dibutyl tin maleate (2) | 51.3 | — |
| 4 | 14 | 600 | 20 | Reofos 95 (50) | Dibutyl tin maleate (2) | 60.0 | — |
| 5 | 11 | 325 | 20 | Reofos 95 (50) | Dibutyl tin maleate (2) | 74.5 | 80.5 |
| 6 | 16 | 530 | 20 | Reofos 95 (50) | Dibutyl tin maleate (2) | 74.5 | 86.0 |
| 7 | 19 | 650 | 20 | Reofos 95 (50) | Dibutyl tin maleate (2) | 69.4 | 90.0 |
| 8 | 26 | 20 |  | Reofos 95 (50) | Dibutyl tin maleate (2) | 59.5 | — |

EXAMPLES 9 TO 15

Examples 9 to 15 in Table 10 show the effect of using different phosphorus esters on the flame retardance of PVC compositions. Haloalkyl phosphates are particularly effective, in particular those used in Examples 10 and 12.

Table 10

| | | | | Polyvinyl Chloride | | | |
| --- | --- | --- | --- | --- | --- | --- | --- |
| Example No. | Naphthalene Oligomer Preparation No. | M. Wt. | Parts of naphthalene oligomer | Phosphorus Ester (parts) | Stabiliser (parts) | TEST RESULTS O.I. | IRHD |
| 9 | 17 | 540 | 20 | 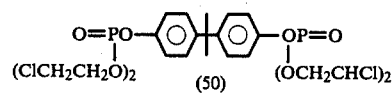 (ClCH₂CH₂O)₂ ... (OCH₂CHCl)₂ (50) | Dibutyl tin maleate (2) | 56.9 | — |
| 10 | 16 | 530 | 20 | O=P[OCH(CH₂Cl)₂]₃ (50) | Epoxidised soya bean oil (Reoplast 39) (4) | 85.0 | 77.0 |
| 11 | 12 | 385 | 20 | [C₆H₅—O]₂P(O)—OC₁₀H₂₁ (50) | Dibutyl tin maleate (2) | 69.4 | 67.5 |
| 12 | 12 | 385 | 20 | CH₂=CH—P(O)—(OCH₂CH₂Cl)₂ (50) | Dibutyl tin maleate (2) | 82.5 | 81.0 |
| 13 | 12 | 385 | 20 | 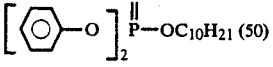 Phosgard 2 × C20 | Epoxidised soya bean oil (2) | 84.3 | — |
| 14 | 17 | 540 | 20 | 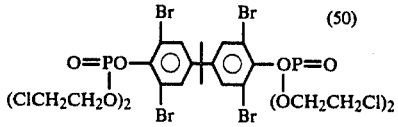 (50) | Dibutyl tin maleate (2) | 56.9 | — |

Table 10-continued

| | | | Polyvinyl Chloride | | | | |
|---|---|---|---|---|---|---|---|
| Example No. | Naphthalene Oligomer Preparation No. | M. Wt. | Parts of naphthalene oligomer | Phosphorus Ester (parts) | Stabiliser (parts) | TEST RESULTS O.I. | IRHD |
| 15 | 10 | 440 | 20 | 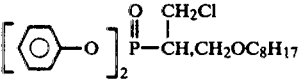 | Dibutyl tin maleate (2) | 64.1 | 84.0 |

EXAMPLES 16 TO 19

Table 11 shows the affect of using naphthalene oligomers prepared by the reaction of naphthalene and formaldehyde in the presence of a catalyst. An improvement in flame retardance is shown in all the Examples compared to Example A and in Examples 16 and 17 improved flexibility is also achieved.

EXAMPLES 20 TO 40

The Examples in Table 12 show the effect of using a conventional PVC plasticiser as part of the composition. A particularly effective phosphorous ester is tris(2-chloroethyl)phosphate. Compositions with high Oxygen Index and good flexibility can be achieved using these formulations, e.g. Example Nos. 28, 29, 31, 32, 33, 35, 36, 37 and 40. Such properties cannot be achieved in PVC using current technology, since an increase in flame retardancy leads to a decrease in flexibility.

Table 11

| | | | Polyvinyl Chloride | | | | |
|---|---|---|---|---|---|---|---|
| Example No. | Naphthalene Oligomer Preparation No. | M Wt. | Parts of naphthalene oligomer | Phosphorus Ester (parts) | Stabiliser (parts) | TEST RESULTS O.I. | IRHD |
| 16 | 39 | 425 | 20 | Reofos 95 (50) | Dibutyl tin maleate (2) | 36 | 83 |
| 17 | 40 | 465 | 20 | Reofos 95 (50) | Dibutyl tin maleate (2) | 35.3 | 85 |
| 18 | 41 | 510 | 20 | Reofos 95 (50) | Dibutyl tin maleate (2) | 40.6 | — |
| 19 | 42 | 550 | 20 | Reofos 95 (50) | Dibutyl tin maleate (2) | 41.8 | 96 |

Table 12.

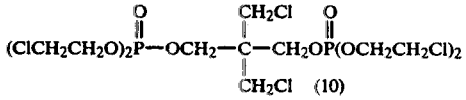

Table 12.-continued

Polyvinyl Chloride

| Example No. | Naphthalene Oligomer Preparation No. | M. Wt. | Parts of naphthalene oligomer | Phosphorus Ester (parts) | Stabiliser (parts) | Plasticiser (parts) | TEST RESULTS | |
|---|---|---|---|---|---|---|---|---|
| | | | | | | | O.T. | IRHD |
| | | | | | maleate (2) | of an alkyl sulphonic acid (25) | | |
| E | — | — | — | " | Dibutyl tin maleate (2) | "Mesamoll" (Aryl ester of an alkyl sulphonic acid) (25) | 28.3 | |
| 24 | 16 | 530 | 20 | Tris (2-chloro-ethyl) phosphate (25) | Epoxidised soya bean oil (4) | "Mesamoll" (Aryl ester of an alkyl sulphonic acid) (25) | 74.0 | 69.5 |
| F | — | — | — | " | Epoxidised soya bean oil (4) | "Mesamoll"(Aryl ester of an alkylsulphonic acid) (25) | 30.4 | 75.0 |
| 25 | 16 | 530 | 20 | " | Epoxidised soya bean oil (4) | "Bis (phenoxy-ethyl) phthalate (25) | 77.7 | 78.0 |
| G | — | — | — | " | Epoxidised soya bean oil (4) | Bis (phenoxy-ethyl) phthalate (25) | 35.0 | 88.0 |
| 26 | 16 | 530 | 20 | Tris (2-chloro-ethyl) phosphate (10) | Epoxidised soya bean oil (4) | Bis (phenoxy-ethyl) phthalate (40) | 35.2 | 86.5 |
| H | — | — | — | " | Epoxidised soya bean oil (4) | Bis (phenoxy-ethyl) phthalate (40) | 29.9 | 89.0 |
| 27 | 16 | 530 | 20 | Tris (2-chloro-ethyl) phosphate (25) | Epoxidised soya bean oil (4) | Butyl benzyl phthalate (25) | 59.9 | 67.0 |
| I | — | — | — | " | Epoxidised soya bean oil (4) | Butyl benzyl phthalate (25) | 33.2 | 76.0 |
| 28 | 16 | 530 | 20 | " | Epoxidised soya bean oil (4) | Di-octyl phthalate (25) | 62.8 | 60.5 |
| J | — | — | — | " | Epoxidised soya bean oil (4) | Di-octyl phthalate (25) | 30.3 | 75.0 |
| 29 | 16 | 530 | 20 | " | Epoxidised soya bean oil (4) | Dioctyl adipate (25) | 58.9 | 65.5 |
| K | — | — | — | " | Epoxidised soya bean oil (4) | Dioctyl adipate (25) | 29.1 | 73.5 |
| 30 | 10 | 440 | 20 | Tris (2-chloro-ethyl) phosphate (10) | Epoxidised soya bean oil (4) | "Linevol" 79 trimellilate (40) | 48.4 | 67.5 |

Table 12.-continued
Polyvinyl Chloride

| Example No. | Naphthalene Oligomer Preparation No. | M. Wt. | Parts of naphthalene oligomer | Phosphorus Ester (parts) | Stabiliser (parts) | Plasticiser (parts) | TEST RESULTS O.T. | IRHD |
|---|---|---|---|---|---|---|---|---|
| L | — | — | — | " | Epoxidised soya bean oil (4) | "Linevol" 79 tri-mellilate (40) | 29.0 | 76.5 |
| 31 | 10 | 440 | 20 | Tris (2-chloro-ethyl) phosphate (15) | Epoxidised soya bean oil (4) | "Linevol" 79 tri-mellilate (35) | 62.5 | 68.0 |
| M | — | — | — | " | Epoxidised soya bean oil (4) | "Linevol" 79 tri-mellilate (35) | 29.3 | 77.5 |
| 32 | 10 | 440 | 20 | Tris (2-chloro-ethyl) phosphate (20) | Epoxidised soya bean oil (4) | "Linevol" 79 tri-mellilate (30) | 70.7 | 67.0 |
| O | — | — | — | " | Epoxidised soya bean oil (4) | "Linevol" 79 tri-mellilate (30) | 30.7 | 77.5 |
| 33 | 10 | 440 | 20 | Tris (2-Chloro-ethyl) phosphate (30) | Epoxidised soya bean oil (4) | "Linevol" 79 tri-mellilate (20) | 75.1 | 67.0 |
| P | — | — | — | " | Epoxidised soya bean oil (4) | "Linevol" 79 tri-mellilate (20) | 33.6 | 78.0 |
| 34 | 10 | 440 | 20 | Tris (2-chloro-ethyl) phosphate (25) | Epoxidised soya bean oil (4) | "Linevol" 79 tri-mellilate (15) | 77.3 | 74.0 |
| Q | — | — | — | " | Epoxidised soya bean oil (4) | "Linevol" 79 tri-mellilate (15) | 34.6 | 85.0 |
| 35 | 10 | 440 | 20 | " | Epoxidised soya bean oil (4) | "Linevol" 79 tri-mellilate (35) | 75.4 | 63.0 |
| R | — | — | — | " | Epoxidised soya bean oil (4) | "Linevol" 79 tri-mellilate (35) | 31.5 | 73.0 |
| 36 | 10 | 440 | 20 | " | Epoxidised soya bean oil (4) | "Linevol" 79 tri-mellilate (45) | 74.1 | 63.0 |
| S | — | — | — | " | Epoxidised soya bean oil (4) | "Linevol" 79 tri-mellilate (45) | 28.4 | 65.0 |
| 37 | 10 | 440 | 20 | " | Epoxidised soya bean oil (4) | "Linevol" 79 tri-mellilate (55) | 69.8 | 58.0 |
| T | — | — | — | " | Epoxidised soya bean | "Linevol" 79 tri-mellilate (55) | 27.4 | 62.0 |

Table 12.-continued

Polyvinyl Chloride

| Example No. | Naphthalene Oligomer Preparation No. | M. Wt. | Parts of naphthalene oligomer | Phosphorus Ester (parts) | Stabiliser (parts) | Plasticiser (parts) | TEST RESULTS O.T. | IRHD |
|---|---|---|---|---|---|---|---|---|
| 38 | 10 | 440 | 20 | Tris (2-chloro-ethyl) phosphate (10) | Epoxidised soya bean oil (4) | Dioctyl phthalate (40) | 37.5 | 80.5 |
| U | — | — | — | " | Epoxidised soya bean oil (4) | Dioctyl phthalate (40) | 25.4 | 79.4 |
| 39 | 10 | 440 | 20 | Tris (2-chloro-ethyl) phosphate (20) | Epoxidised soya bean oil (4) | Dioctyl phthalate (35) | 52.8 | 70.5 |
| V | — | — | — | Tris (2-chloro-ethyl) phosphate (15) | Epoxidised soya bean oil (4) | Dioctyl phthalate (35) | 27.4 | 77.5 |
| 40 | 10 | 440 | 20 | Tris (2-chloro-ethyl) phosphate (20) | Epoxidised soya bean oil (4) | Dioctyl phthalate (30) | 61.0 | 69.5 |
| W | — | — | — | " | Epoxidised soya bean oil (4) | Dioctyl phthalate (30) | 28.3 | 77.0 |

EXAMPLES 41–46

The examples in Table 13 illustrate the effect of gradually increasing the concentration of naphthalene oligomer. It can be seen that an increase in Oxygen Index occurs together with an improvement in flexibility as the concentration of naphthalene oligomer is increased.

EXAMPLES 47–50

Table 14 illustrates the use of more than one phosphorus ester, together with a conventional PVC plasticiser or extender. In all examples an improvement in Oxygen Index occurs, and in Examples 47, 48 and 49 an improvement in flexibility also is achieved.

Table 13.

Polyvinyl Chloride

| Example No. | Naphthalene Oligomer Preparation No. | M. Wt. | Parts of Naphthalene Oligomer | Phosphorus Ester (parts) | Stabiliser (parts) | TEST RESULTS O.I. | IRHD |
|---|---|---|---|---|---|---|---|
| 41 | 10 | 440 | 5 | Reofos (95) (50) | Dibutyl tin maleate (2) | 34.6 | 87.0 |
| 42 | 10 | 440 | 10 | Reofos (95) (50) | Dibutyl tin maleate (2) | 43.7 | 84.5 |
| 43 | 10 | 440 | 15 | Reofos (95) (50) | Dibutyl tin maleate (2) | 57.8 | 80.0 |
| 44 | 10 | 440 | 20 | Reofos (95) (50) | Dibutyl tin maleate (2) | 71.3 | 78.0 |
| 45 | 10 | 440 | 25 | Reofos (95) (50) | Dibutyl tin maleate (2) | 72.1 | 73.5 |
| 46 | 10 | 440 | 30 | Reofos (95) (50) | Dibutyl tin maleate (2) | 74.4 | 70.0 |

Table 14

| Example No. | Naphthalene Oligomer Preparation No. | M. Wt. | Parts of naphthalene oligomer | Phosphorus Ester (parts) | | Stabiliser (parts) | Extender/ Plasticiser (parts) | TEST RESULTS O.I. | IRHD |
|---|---|---|---|---|---|---|---|---|---|
| 47 | 10 | 440 | 20 | Reofos 95(20) | tris(2-chloro-ethyl)phosphate (5) | Dibutyl maleate (2) | "Linevol" 79 tri-melli (25) | 54.9 | 66.0 |
| X | — | — | — | Reofos 95(20) | tris(2-chloro-ethyl)phosphate (5) | Dibutyl maleate (2) | "Linevol" 79 tri-melli (25) | 28.9 | 82.5 |
| 48 | 10 | 440 | 20 | Reofos 95(15) | tris(2-chloro-ethyl)phosphate (10) | Dibutyl maleate (2) | "Linevol" 79 tri-melli (25) | 66.2 | 65.5 |
| Y | — | — | — | Reofos 95(15) | tris(2-chloro-ethyl)phosphate (10) | Dibutyl maleate (2) | "Linevol" 79 tri-melli (25) | 30.5 | 79.0 |
| 49 | 10 | 440 | 20 | Reofos 95(10) | tris(2-chloro-ethyl)phosphate (15) | Dibutyl maleate (2) | "Linevol" 79 tri-melli (25) | 69.1 | 66.0 |
| Z | — | — | — | Reofos 95(10) | tris(2-chloro-ethyl)phosphate (15) | Dibutyl maleate (2) | "Linevol" 79 tri-melli (25) | 31.1 | 79.0 |
| 50 | 10 | 440 | 20 | Reofos 95(20) | tris(2-chloro-ethyl)phosphate (5) | Epoxidised soya bean oil (4) | Cereclor S52 (25) | 73.4 | 78 |
| A¹ | — | — | — | Reofos 95(20) | tris(2-chloro-ethyl)phosphate (5) | Epoxidised soya bean oil (4) | Cereclor S52 (25) | 31.6 | 77.5 |

The preparation of the oligomers used in the formulations of Table 15 is as described previously. However, except for Oligomer No. 38 the crude products were dissolved in toluene or chloroform and washed with water prior to steam stripping and vacuum stripping. Preparative and analytical data on these oligomers is given in Table 15.

Examination of Table 15 shows that all the compositions of the invention have superior Oxygen Index compared to the blank B'.

Table 15

| Example No. | Oligomer Preparation No. | Molecular weight | Parts of oligomer | Phosphorus Ester (parts) | Stabiliser (parts) | TEST RESULTS O.I. | IRHD |
|---|---|---|---|---|---|---|---|
| 51 | 31 | | 20 | Reofos 95 (50) | Dibutyl tin maleate (2) | 36.9 | 85.0 |
| B' | — | — | — | Reofos 95 (50) | Dibutyl tin maleate (2) | 33.0 | 91.0 |
| 52 | 32 | 650 | 20 | Reofos 95 (50) | Dibutyl tin maleate (2) | 38.2 | 87.0 |
| 53 | 33 | | 20 | Reofos 95 (50) | Dibutyl tin maleate (2) | 46.1 | 84.0 |
| 54 | 34 | 550 | 20 | Reofos 95 (50) | Dibutyl tin maleate (2) | 36.9 | 85.0 |
| 55 | 35 | 500 | 20 | Reofos 95 (50) | Dibutyl tin maleate (2) | 37.1 | 86.5 |
| 56 | 36 | 470 | 20 | Reofos 95 (50) | Dibutyl tin maleate (2) | 57.9 | 82.5 |
| 57 | 37 | 410 | 20 | Reofos 95 (50) | Dibutyl tin maleate (2) | 44.3 | 73.0 |
| 58 | 38 | | 20 | Reofos 95 (50) | Dibutyl tin maleate (2) | 38.2 | 89.0 |

What we claim is:

1. A composition comprising a chlorine-containing aliphatic polymer and (a) an ester of a phosphorus acid, and (b) an aromatic hydrocarbon-containing oligomer of the formula $$(A)_a(-CH_2-)_b[-CH_2(OCH_2)_mOCH_2-]_c(-CH_2X)_d$$

wherein A is at least one aromatic hydrocarbon-containing radical wherein the aromatic hydrocarbon moiety is selected from the group consisting of benzene, naphthalene and diphenyl ether, X is a member selected from the group consisting of —OH, —OR, $$-O\overset{\overset{\displaystyle O}{\|}}{C}R,$$

phenoxy, benzyloxy and alkylphenoxy wherein R represents (1) a straight or branched chain alkyl having 1 to 12 carbon atoms, (2) cycloalkyl to 5 to 12 carbon atoms, (3) cycloalkenyl of 5 to 12 carbon atoms, or one of said groups (1) to (3) substituted by halogen, epoxy, nitro, amino, amido, ether, carboxyl, or ester groups, a is 2 to 20 but equals b+c+1, b is 0 to 19, c is 0 to 19, d is 0 to 2a and m is 0 to 10, there being at least two (—CH₂X) groups per molecule, each —CH₂O—CH₂ portion of the group [CH₂(OCH₂)ₘOCH₂] counting as (—CH₂X) for this purpose, the said groups (—CH₂—), [—CH₂(OCH₂)ₘOCH₂—] and (—CH₂X) being bonded directly to a nuclear carbon atom of the aromatic hydrocarbon-containing radical.

2. A composition as claimed in claim 1, in which m is 0.

3. A composition as claimed in claim 1, in which A is unsubstituted other than by the said groups (—CH₂—), [—CH₂(OCH₂)ₘOCH₂—] and (—CH₂X) or is substituted additionally by one or two groups selected from halogen, alkyl of 1 to 4 carbon atoms, haloalkyl of 2 to 4 carbon atoms, and the group OR³ where R³ represents hydrogen, alkyl of 1 to 4 carbon atoms or acyl of 1 to 4 carbon atoms.

4. A composition as claimed in claim 1, in which greater than 50 mol % of radicals A are derived from naphthalene.

5. A composition as claimed in claim 4, in which more than 75 mol % of radicals A are derived from naphthalene.

6. A composition as claimed in claim 4, in which the naphthalene radicals are linked by (—CH₂—O—CH₂—) groups and the links are attached to the positions 1,4; 1,5; 1,6; 1,7; 2,5; 2,6 or 2,7 on the naphthalene nucleus.

7. A composition as claimed in claim 6, in which the links are attached to the 1,4 or 1,5 positions on the naphthalene nucleus.

8. A composition as claimed in claim 1, in which X is —OH, —OCH₃, —OC₆H₅ or

9. A composition as claimed in claim 1, in which the oligomer has a number average molecular weight of 300 to 3500.

10. A composition as claimed in claim 9, in which the oligomer has a number average molecular weight of 350 to 1500.

11. A composition as claimed in claim 10, in which the oligomer has a number average molecular weight of 400 to 1000.

12. A composition as claimed in claim 1, in which the ester (a) is derived from phosphoric acid, phosphonic acid, phosphinic acid or phosphorous acid.

13. A composition as claimed in claim 1, in which acid groups in partial esters are present as free acid groups or as a salt.

14. A composition as claimed in claim 1, in which the ester (a) is an ester of pentavalent phosphorus.

15. A composition as claimed in claim 14, in which ester (a) is a triaryl phosphate a tri-halo-alkyl phosphate a dialkyl aryl phosphate or a diaryl alkyl phosphate.

16. A composition as claimed in claim 1, in which the polymer contains at least 5% chlorine.

17. A composition as claimed in claim 16, in which the polymer contains more than 20% chlorine.

18. A composition as claimed in claim 17, in which the polymer contains more than 40% chlorine.

19. A composition as claimed in claim 1, in which the polymer is polyvinyl chloride, chlorinated polybutene, poly-chloroprene, poly-vinylidene chloride, chlorinated poly-4,4-dimethyl pentene, chlorinated polyethylene, chlorinated polypropylene, chlorinated polyethylene containing some chlorosulphonyl groups.

20. A composition as claimed in claim 1, in which components (a) and (b) are present in a ratio of from 0.1 to 10 to 10 to 0.1.

21. A composition as claimed in claim 20, in which the ratio of (a) and (b) is from 1:5 to 5:1.

22. A composition as claimed in claim 21, in which the ratio of (a) and (b) is from 1:5 to 3:1.

23. A composition as claimed in claim 1, in which 0.1 to 150 parts by weight of (a) plus (b) are used per 100 parts by weight of polymer.

24. A composition as claimed in claim 23, in which from 2 to 100 parts of (a) plus (b) are used per 100 parts of polymer.

25. A composition as claimed in claim 24, in which 5 to 25 parts of (a) plus (b) are used per 100 parts of polymer.

26. A composition as claimed in claim 1, in which the oligomer (b) is admixed with a compound of the formula ACH₂X where A and X are as defined in claim 1.

27. A composition as claimed in claim 1, which also contains at least one member of the group consisting of a heat stabilizer, light stabilizer, antioxidant filler, pigment, lubricant, blowing agent, fungicide, Friedel Crafts catalyst or precursor thereof, extender, other fire retardant additive and smoke suppressant.

28. A composition as claimed in claim 1, which also includes a phosphorus-free plasticizer in admixture with ester (a).

29. A composition as claimed in claim 28, in which a phosphate ester is used with a phthalate ester or an adipate ester.

30. A composition as claimed in claim 27, in which the phosphorus acid ester is present in a concentration of at least 50% in such mixtures.

31. A composition as claimed in claim 30, in which the phosphorus acid ester is used in a concentration of at least 75%.

32. A composition as claimed in claim 28, in which the phosphorus acid ester comprises a haloalkyl phosphate either alone or with an aryl phosphate, and the amount of phosphorus-free plasticizer is up to 90%.

* * * * *